…

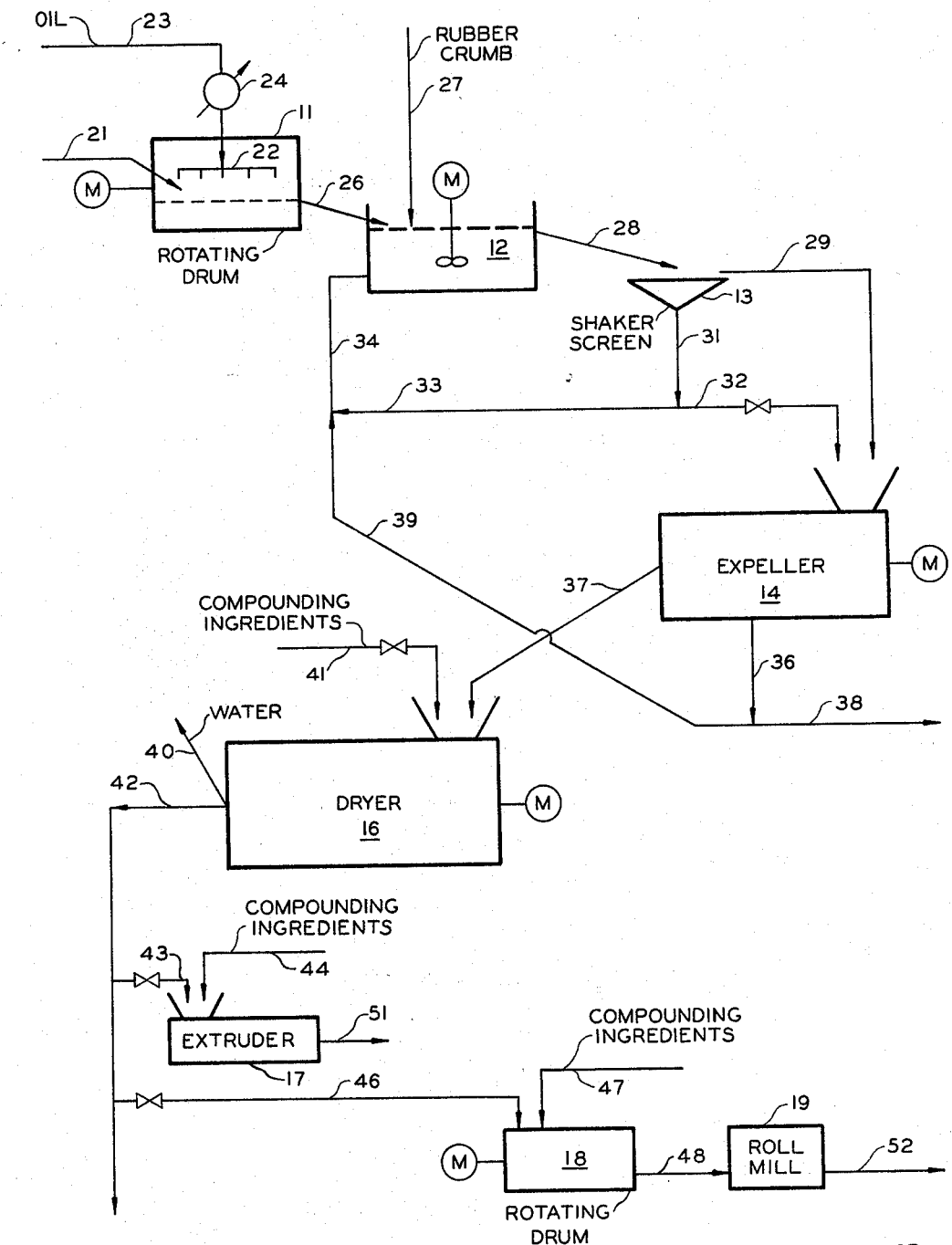

United States Patent Office 3,290,268
Patented Dec. 6, 1966

3,290,268
RUBBER MASTERBATCHING
Raymond C. Scofield, Bartlesville, Okla., assignor to Phillips Petroleum Company, a corporation of Delaware
Filed Nov. 16, 1964, Ser. No. 411,468
3 Claims. (Cl. 260—41.5)

This invention relates to rubber masterbatching.

The term masterbatching relates to operations involved in the rubber compounding art. The present invention is pertinent to each of the types described below.

In one operation, all or a part of the compounding ingredients are incorporated with the rubber which is then subsequently formed and cured. A composition in which all of the compounding ingredients are incorporated and the material shaped is known as camelback. Other rubber compounders desire to have a masterbatch containing substantially all of the compounding ingredients. In such compositions, it is normal to omit the accelerator activator since this material may interfere with subsequent handling. The accelerator activator, in such a case, is added immediately prior to the final forming of the product. In still other situations, it is desirable to add a filler, such as silica or carbon black, and a processing oil. This is frequently done to avoid the disagreeable operation of black addition in the plant of a maker of a finished article such as a tire. The rubbery component of such mixture is usually a stiff product and the oil is added to facilitate the compounding thereof.

The other type of masterbatch is one in which all or a part of the compounding ingredients are added to rubber in an amount different from that desired in the final article. In such operation, the compounding ingredients, in desired proportion, are added to rubber and the resulting composition subsequently mixed with an additional quantity of rubber to produce a final composition, additional compounding ingredients being added as desired. Such operation simplifies the process for the producer of the final article, since it is only necessary to mix the masterbatch with rubber to produce a desired composition, the weighing and incorporation of additional ingredients having been done for such a producer.

As used herein, the term "compounding ingredient" is used as a word of art and is one which will be fully understood by those skilled in the art of rubber compounding. The list of materials which have been incorporated in rubber is almost unlimited in the literature relating to the production of rubber products. The rubber curing recipe involves a number of components including antioxidants, softeners, such as oils and asphalts, fillers, vulcanizing agents, accelerators, accelerator activators, and, in many cases, additional ingredients. For specific examples of such recipes, reference is made to the book "Synthetic Rubber" by Whitby, copyright 1954 by John Wiley & Sons, Inc., and chapter 11 in particular.

The following are objects of this invention.

The primary object of this invention is to provide an improved method of preparing rubber masterbatches or mixtures. A further object of this invention is to provide a method of preparing a mixture of black, oil, and rubber. A further object of this invention is to provide a method for the production of a rubber stock such as camelback containing all of the compounding ingredients. A further object of this invention is to provide a method of preparing a masterbatch wherein the loss of ingredients, either rubber or black, as fines, is reduced.

Other objects and advantages of the present invention will be apparent to those skilled in the art upon reading the accompanying disclosure which includes:

A drawing showing, in schematic form, apparatus for practicing the various aspects of this invention.

Broadly, the invention resides in a method for the production of an oil-filler-rubber mixture comprising providing first and second mixing zones, said second mixing zone containing a liquid which has substantially no solvent power for other materials introduced thereinto; introducing a solid filler for rubber into said first mixing zone; adding a liquid additive for rubber in liquid form to said first mixing zone thereby forming a filler-liquid additive mixture; passing the resulting filler-liquid mixture to said second mixing zone; introducing rubber crumb into said second mixing zone; removing filler-liquid additive mixture, rubber crumb, and non-solvent liquid from said second mixing zone and passing same to a liquid-solid separation zone, recovering (1) a filler-liquid additive-rubber wet with non-solvent liquid and (2) a separate non-solvent liquid containing fines from said liquid-solid separation zone; passing stream (1) and a portion of stream (2) to a compression zone to remove the major portion of the non-solvent liquid from the filler-liquid additive-rubber mixture; passing the rest of stream (2) to said second mixing zone; passing non-solvent liquid removed from said mixture in said compression zone to said second mixing zone; and passing filler-liquid additive-rubber mixture containing a small amount of non-solvent liquid to a closed milling zone wherein said filler-liquid additive-rubber mixture is heated to a temperature sufficiently high that non-solvent liquid vaporizes therefrom upon release of said mixture from said milling zone thereby producing a substantially dry filler-liquid additive-rubber mixture.

In a specific embodiment, the invention provides a method for the production of an oil-black-rubber mixture comprising introducing carbon black pellets into a tumbling zone; spraying oil heated to a temperature of 100 to 250° F. in an amount to provide oil-black ratio of 10 to 1 to 0.5 to 1; passing said oil-black mixture to a water slurry zone; introducing rubber crumb having a particle dimension of approximately ¼ inch to said water slurry zone; removing oil-black mixture, rubber crumb, and water from said slurry zone and passing same to a liquid-solid separation zone; recovering a wet black-oil-rubber mixture stream and a water stream containing black and rubber fines from liquid-solid separation zone; passing said wet black-oil-rubber mixture and ⅕ to ⅗ of said water stream containing fines to a compression zone to remove sufficient water to provide a black-oil-mixture containing 2 to 20 weight percent water; passing the rest of said water stream containing fines to said water slurry zone; passing water removed from said mixture in said compression zone to said slurry zone; and passing black-oil-mixture containing up to 10 weight percent water to a closed milling zone wherein said black-oil-rubber mixture is heated to a temperature of 212 to 500° F. so that water vaporizes therefrom upon release of said mixture from said milling zone to produce a black-oil-rubber mixture containing less than 0.5 weight percent water.

The process of the present invention can probably be best understood from consideration of the drawing, including the apparatus schematically shown therein. The principal apparatus components include a rotating drum 11, a slurry mixing tank 12, a shaker screen 13, an expeller 14, a dryer 16, an extruder 17, a rotating drum 18, and a roll mill 19. All of these components will be standard equipment available to the rubber processing industry. Two of the newer pieces of equipment are the expeller 14 and the dryer 16. The expeller 14 is described by Dunning et al. in Chemical Engineering Progress, 57, No. 5, 53–54 (1961). The preferred dryer is substantially an extruder and is frequently referred to as an expander. The machine consists of a worm shaft which is continuous in the feed section and interrupted in compression and mixing sections. Breaker bolts in the barrel are positioned between the interrupted flight sections. A jacket for temperature control can be included. The expander discharges through a die plate equipped with a two-bladed die face cutter.

In the process, carbon black, generally as pellets, is fed to rotating drum 11 by conduit 21. Through spray head 22, oil supplied by conduit 23 is sprayed onto the carbon black in rotating drum 11. Heater 24 is placed in line 23 since it is preferred to supply heated oil to the pellets. A wide variety of temperature ranges can be used but the oil is generally heated to a temperature of 100 to 350° F. The amount of oil and black used depends upon the amount and ratio of these ingredients which are desired in the final composition. A frequent range for these components provides an oil-black ratio of 10 to 1 to 0.5 to 1 on a weight basis.

The black-oil mixture is passed by line 26 to slurry mixing tank 12, this tank being supplied with liquid, generally water, obtained as hereinafter set forth. Rubber crumb, generally with an antioxidant already added, is supplied to slurry mixing zone 12 through conduit 27 in an amount to provide the desired mixture of black, oil, and rubber. The mixture of oil, black and rubber crumb is passed to shaker screen 13 by conduit 28, this generally being a simple overflow line connected to zone 12. Slurry mixing zone 12 is agitated so that the mixture in line 28 contains representative amounts of the materials present. The fact that the rubber crumb and the oiled black have substantially the same density eliminates a need for vigorous agitation although some agitation of this zone is necessary. Also, the rubber crumb is somewhat sticky and the black particles containing oil adhere thereto to some extent. Free water is removed from the solid mixture upon passing the same over shaker screen 13, most of the solid passing by line 29 to expeller 14. The liquid stream is removed from shaker screen 13 through line 31. Even though most of the solids are of sufficient size to be separated from the liquid by shaker screen 13, some fine particles are always present and these appear in liquid stream 31. The size of the particles designated as "fines" depends, of course, upon the size of the holes in shaker screen 13. This liquid stream 31 is divided with a portion going by line 32 to expeller 14 and the rest of stream 31 passing by lines 33 and 34 to supply a part of the liquid used in slurry mixing zone 12. The division of these streams is not critical but it is usual to supply approximately one-third of the stream to the expeller and two-thirds thereof to mixing zone 12.

The division of these streams provides one advantage for this invention since it is apparent that none of the fines are lost. The small proportion of fines passes to expeller 14 will be held by the large amount of the black-oil-rubber mixture supplied thereto by line 29. The fines in line 33, upon being returned to mixing zone 12 will, in large part, be agglomerated with the rubber fed thereto. For best results, one-fifth to three-fifths of the shaker screen liquid effluent is passed to expeller 14.

In expeller 14, most of the liquid is squeezed from the rubber product, the liquid being removed by line 36 and a solid product removed by line 37. A portion of the liquid can be discharged to waste through line 38 with the major portion thereof being recycled by line 39 and 34 to mixing zone 12. The expeller product line 37 usually contains approximately 2 to 20 weight percent water. This wet material must be further dried to provide a specification product, the finished masterbatch generally requiring less than 1, and usually less than 0.5, weight percent water. This final drying is carried out in dryer 16. In one type of dryer used in this work, the screw had a feed section, a compression section of 3 worms and a mixer section of 15 worms. In the mixer section 38, breaker bolts extended into interruptions in the worm flights. If desired, some of the additional compounding ingredients can be introduced by conduit 41 communicating with dryer 16. The final product, being substantially dry, is extruded from the dryer and obtained in conduit 42. In usual operation, the mixture is heated sufficiently so that water evaporates from the product as it is extruded from dryer 16 because of the heat supplied thereto, the vapor stream being shown as line 40. This product can be the product which is sold to the producer of rubber goods.

I have also shown two systems for preparing more fully compounded products and these can be used alternately or simultaneously to produce a number of different products from the same plant. Black-oil-rubber mixture can be passed by conduit 43 to extruder 17 and desired compounding ingredients supplied by conduit 44. This is a mixing extruder of which several types are well known in the art. One example is shown by Fuller in Reissue Patent 23,948 (1955). Another form of preparing the final product is to supply rubber to rotating drum 18 from conduit 42 through conduit 46. Compounding ingredients, in this case, are supplied by conduit 47. A simple mixture is made in rotating drum 18, the final mixing being carried out in roll mill 19, supplying the mixture thereto through conduit 48. The final product, in either of these last cases, can be a final curable composition or an intermediate composition in which certain ingredients have been added to the black-oil-rubber mixture. These final products are obtained through conduits 51 and 52, respectively.

Obviously, from the above description, there are a wide variety of defferent types of operation which can be carried out using my invention. The following example illustrates one specific embodiment of the invention but this example should not be considered as unduly limiting.

*Example*

Using the process set forth in the drawing of this invention, a masterbatch containing black, oil, and rubber is prepared. In this work, the extender oil is heated to 250° F. The rubber crumb supplied to the mixing slurry tank is the product from a steam stripping operation (such as disclosed in Hall 3,076,795 (1963)) as a slurry with a water content of 50 weight percent. The holdup time in the mixing tank is approximately 10 minutes. The slurry passed to the shaker screen is at 90° F. The following material balance sets forth the full operation for this system, the amounts being given in pounds per minute:

TABLE

| | Stream No. | Carbon Black | Oil | Rubber | Water | Masterbatch | Fines |
|---|---|---|---|---|---|---|---|
| Black Feed | 21 | 80 | | | | | |
| Oil | 23 | | 35 | | | | |
| Black-Oil Feed to Slurry Tank | 26 | 80 | 35 | | | | |
| Wet Rubber Crumb | 27 | | | 100 | 100 | | |
| Slurry Tank Discharge | 28 | | | | 500 | | |
| Solids from Shaker Screen | 29 | | | | 215 | 210 | 14 |
| Liquid Stream from Shaker Screen | 31 | | | | 285 | | 14 |
| Liquid Stream to Compression Zone | 32 | | | | 100 | | 5 |
| Liquid Stream to Slurry Tank | 39 | | | | 185 | | 9 |
| Solids from Compression Zone | 37 | | | | 25 | 215 | |
| Water from Compression Zone | 36 | | | | 290 | | |
| Water Recycle to Slurry Tank | 39 | | | | 215 | | |
| Masterbatch from Milling Zone | 42 | | | | | 215 | |
| Water from Milling Zone | 40 | | | | 25 | | |

From this table, it is apparent that a product is obtained containing 35 parts of oil and 80 parts of black per 100 parts of rubber. A good dispersion of black is obtained. Even when the black is not completely dispersed in the rubber, the product is satisfactory because the black will be adequately dispersed during the incorporation of additional compounding ingredients.

As stated, the amounts of black and oil can vary considerably and such variation is not a part of the present invention. In general, as the Mooney viscosity of the rubber increases, the amount of oil is increased. As the total of oil and rubber is increased, the amount of black is increased.

The example illustrates advantages of the invention. The masterbatch is made during the drying of the rubber, thereby eliminating a separate Banbury mixing operation. Also, the system is continuous rather than batch.

In the foregoing description, I have used the term "rubber" broadly. I intend that the invention be so considered because it is not limited to a specific type of rubber. Most of my work has been with cis-1,4-polybutadiene, containing 85 to 100 percent cis-1,4-addition. Catalysts useful in producing such polymers have been fully disclosed in the art. However, rubber in crumb form is obtained as the result of many types of rubber production. One of the newer types are EPT rubbers. The crumb can be that obtained from the SBR emulsion polymerization process. Natural and synthetic isoprene polymers can be used. Other rubbers such as butadiene/acrylonitrile copolymers are obtained in similar form, as well as the butyl rubbers obtained by polymerizing isobutylene with a small concentration of isoprene. In any case, the rubber and the oil should be compatible.

As many possible embodiments can be made of this invention without departing from the scope thereof, it is to be understood that all matter herein set forth is to be interpreted as illustrative and not as unduly limiting the invention.

I claim:
1. A method for the production of an oil-filler-rubber mixture comprising providing first and second mixing zones, said second mixing zone containing a liquid which has substantially no solvent power for other materials introduced thereinto; introducing a solid filler for rubber into said first mixing zone; adding a liquid additive for rubber in liquid form to said first mixing zone thereby forming a filler-liquid additive mixture; passing the resulting filler-liquid mixture to said second mixing zone; introducing rubber crumb into said second mixing zone; removing filler-liquid additive mixture, rubber crumb, and non-solvent liquid from said second mixing zone and passing same to a liquid-solid separation zone, recovering (1) a filler-liquid additive-rubber wet with non-solvent liquid, and (2) a separate non-solvent liquid containing fines from said liquid-solid separation zone; passing stream (1) and a portion of stream (2) to a compression zone to remove the major portion of the non-solvent liquid from the filler-liquid additive-rubber mixture; passing the rest of stream (2) to said second mixing zone; passing non-solvent liquid removed from said mixture in said compression zone to said second mixing zone; and passing filler-liquid additive-rubber mixture containing a small amount of non-solvent liquid to a closed milling zone wherein said filler-liquid additive-rubber mixture is heated to a temperature sufficiently high that non-solvent liquid vaporizes therefrom upon release of said mixture from said milling zone thereby providing a substantially dry filler-liquid additive-rubber mixture.

2. A method for the production of an oil-black-rubber mixture comprising introducing carbon black into a tumbling zone; spraying oil onto said black in said tumbling zone to provide a black-oil mixture; passing oil-black mixture to a water slurry zone; introducing rubber crumb to said water slurry zone; removing oil-black mixture, rubber crumb, and water from said slurry zone and passing same to a liquid-solid separation zone; recovering a wet black-oil-rubber mixture stream and a water stream containing fines from said liquid-solid separation zone; passing said wet black-oil-rubber mixture and a portion of said water stream containing fines to a compression zone to remove the major portion of the water from the black-oil-rubber mixture; passing the rest of said water stream containing fines to said water slurry zone; passing water removed from said mixture in said compression zone to said slurry zone; and passing black-oil-rubber mixture containing a small amount of water to a closed milling zone wherein said black-oil-rubber mixture is heated to a temperature sufficiently high that water vaporizes therefrom upon release of said mixture from said milling zone thereby producing a substantially dry black-oil-rubber mixture.

3. A method for the production of an oil-black-rubber mixture comprising introducing carbon black pellets into a tumbling zone; spraying oil heated to a temperature of 100 to 250° F. in an amount to provide oil-black ratio of 10 to 1 to 0.5 to 1; passing said oil-black mixture to a water slurry zone; introducing rubber crumb having a particle dimension of approximately ¼ inch to said water slurry zone; removing oil-black mixture, rubber crumb, and water from said slurry zone and passing same to a liquid-solid separation zone; recovering a wet black-oil-rubber mixture stream and a water stream containing black and rubber fines from liquid-solid separation zone; passing said wet black-oil-rubber mixture and ⅕ to ⅗ of said water stream containing fines to a compression zone to remove sufficient water to provide a black-oil-mixture containing 2 to 20 weight percent water; passing the rest of said water stream containing fines to said water slurry zone; passing water removed from said mixture in said compression zone to said slurry zone; and passing black-oil-mixture containing up to 10 weight percent water to a closed milling zone wherein said black-oil-rubber mixture is heated to a temperature of 212 to 500° F. so that water vaporizes therefrom upon release of said mixture from said milling zone to produce a black-oil-rubber mixture containing less than 0.5 weight percent water.

No references cited.

MORRIS LIEBMAN, *Primary Examiner.*

J. S. WALDRON, *Assistant Examiner.*